United States Patent [19]

Alexander

[11] 3,928,258

[45] Dec. 23, 1975

[54] PREPARATION OF LOW FRIABILITY RIGID POLYURETHANE FOAM

[75] Inventor: Roy P. Alexander, Killingworth, Conn.

[73] Assignee: Olin Corporation, New Haven, Conn.

[22] Filed: Sept. 23, 1974

[21] Appl. No.: 508,544

[52] U.S. Cl. .................. 260/2.5 AS; 260/2.5 AM
[51] Int. Cl.² ................. C08G 18/14; C08G 18/48; C08G 18/50
[58] Field of Search ................. 260/2.5 AS, 2.5 AM

[56] References Cited
UNITED STATES PATENTS

| | | | |
|---|---|---|---|
| 3,269,961 | 8/1966 | Bruson | 260/2.5 AP |
| 3,369,014 | 2/1968 | Booth | 260/2.5 AS |
| 3,419,532 | 12/1968 | Jackson | 117/138.8 D |
| 3,442,888 | 5/1969 | Degginger | 260/2.5 AS |
| 3,630,973 | 12/1971 | Ardis | 260/2.5 AM |
| 3,728,288 | 4/1973 | Cobbs | 260/2.5 AS |
| 3,741,921 | 6/1973 | Lapkin | 260/2.5 AS |
| 3,847,844 | 11/1974 | Fuzesc | 260/2.5 AS |

*Primary Examiner*—Donald E. Czaja
*Assistant Examiner*—C. Warren Ivy
*Attorney, Agent, or Firm*—F. A. Iskander; T. P. O'Day

[57] ABSTRACT

An improvement is disclosed in the preparation of rigid polyurethane foams which have relatively high surface friability. The improvement resides in the use of a select group of supplemental polyether polyols having 2–3 hydroxy groups in order to reduce the friability of the resulting foam.

17 Claims, No Drawings

PREPARATION OF LOW FRIABILITY RIGID POLYURETHANE FOAM

This invention relates to an improvement in the production of polyurethane foam. More particularly, the invention relates to the reduction of surface friability in rigid polyurethane foams.

It is known in the art that polyether polyols which are derived from 4,4,4-trichloro-1,2-epoxybutane can be used to advantage in the preparation of a highly flame retardant, rigid polyurethane foam. See for example U.S. Pat. Nos. 3,269,961, 3,630,973, and 3,741,921.

However, it has recently been learned that the use of certain such polyols yields a foam which is often plagued with a high degree of surface friability. As such, the foam requires special handling and it cannot be used to advantage, if at all, in those applications in which the foam is sprayed onto, and is required to adhere to, certain surfaces such as in the on-site insulation of homes and industrial structures.

Now an improvement has been found for eliminating or minimizing the surface friability of rigid otherwise friable polyurethane foam. This objective is achieved, according to the invention by including in the foam forming reaction mixture a select group of polyether polyols having 2-3 hydroxy groups and a molecular weight from about 1,000 to about 6,000.

The improvement disclosed herein may be utilized in reducing the friability of any rigid polyurethane foam which is characterized by a relatively high degree of surface friability. However, it is preferred to employ the improvement of the invention in connection with the preparation of those rigid polyurethane foams which are prepared from a reaction mixture comprised of an organic polyisocyanate, a foaming agent, a reaction catalyst and, as the main reactive polyol, an adduct of a polyhydroxy compound and 4,4,4-trichloro-1,2-epoxybutane. This adduct, hereinafter referred to as the "main polyol reactant", may be prepared by methods well known in the art. For example, it can be prepared by condensing, optionally in the presence of an oxyalkylation catalyst, a polyhydroxy initiator compound with 4,4,4-trichloro-1,2-epoxybutane.

Although any polyhydroxy compound may be employed in preparing the main polyol reactant, it is preferred to employ a polyhydroxy compound which comprises a carbohydrate or a carbohydrate derivative. Illustrative are sucrose, dextrose, and mixtures of sucrose or dextrose with water and/or with an aliphatic diol or triol. Exemplificative of the latter are ethylene glycol, propylene glycol, the butylene glycols, glycerol, trimethylolpropane, triethylolpropane, mixtures thereof and the like.

A particularly preferred group of initiators for use in preparing the main polyol reactant is that selected from the group consisting of a mixture of dextrose and water, a mixture of dextrose and an aliphatic diol or triol, and a mixture of dextrose, water and an aliphatic diol or triol. Any suitable molar ratio of dextrose to water and/or diol or triol may be used in preparing such mixtures. For example at least about 0.6, and preferably about 0.9-3 moles each of water and/or diol or triol may be employed per mole of dextrose. A more detailed description concerning the preparation of these mixtures is provided in U.S. Pat. No. 3,741,921, issued June 26, 1973 to M. Lapkin, the entire disclosure of which is incorporated by reference herein. As used in the specification and claims herein, the term "dextrose" is intended to include hydrous dextrose, such as α-d-glucose monohydrates, as well as anhydrous dextrose, e.g., d-glucose. In accordance with the most preferred embodiments of the invention a mixture of dextrose and an aliphatic diol or triol is used as the initiator.

The 4,4,4-trichloro-1,2-epoxybutane may be used in purified form, as a crude product of the dehydrohalogenation of 4,4,4-trichloro-2-halobutanol, or as a mixture with a non-halogenated alkylene oxide, e.g., ethylene oxide, propylene oxide, butylene oxide and mixtures thereof. Thus the term "4,4,4-trichloro-1,2-epoxybutane" as used in the specification and claims herein includes any such materials and mixtures which are suitable for condensation with a polyhydroxy initiator to form a polyol that is useful in the production of polyurethane foam.

In preparing the main polyol reactant, a wide variety of conventional oxyalkylation catalysts may be employed, if desired, to promote the condensation reaction between the 4,4,4-trichloro-1,2-epoxybutane and the polyhydroxy initiator. However, when a catalyst is used it is preferred to use an acid catalyst such as a Lewis acid, e.g., boron trifluoride or an etherate derivative thereof. Usually carried out at a temperature of about 30°–200°C, the condensation reaction is allowed to proceed until a polyether polyol is obtained which has a hydroxyl number from about 150 to about 800, preferably about 260–550, and more preferably about 300–450.

Pursuant to the method of the invention, the polyurethane foam is prepared from a reaction mixture comprising a main polyol reactant, as described above, and a select second polyether polyol. This second polyol, the use of which is critical to reducing the friability of the foam according to the invention, is hereinafter referred to as the "supplemental polyol".

As indicated above, the supplemental polyol is characterized by a functionability of 2–3, i.e., 2–3 hydroxy groups in the molecule, and a molecular weight of about 1,000–6,000. In accordance with the conventional method for converting molecular weight to hydroxyl number, this molecular weight range corresponds to a hydroxyl number range of about 115–19 in the case of the difunctional supplemental polyols and about 168–28 in the case of the trifunctional supplemental polyols.

As with the main polyol reactant, the supplemental polyol can be prepared by prior art oxxyalkylation techniques. For example it can be prepared by condensing, in the presence of an alkaline catalyst such as KOH, an aliphatic diol, triol or mixture thereof with an alkylene oxide having 2–4 carbon atoms or with a mixture of such oxides using random or stepwise oxyalkylation techniques. Illustrative such oxides are ethylene oxide, propylene oxide and butylene oxide. The aliphatic diols and triols which are used in preparing the supplemental polyol include those mentioned illustratively above in connection with the preparation of the main polyol reactant.

In accordance with a preferred embodiment of the invention, the supplemental polyol is prepared using, as the oxyalkylating agent, propylene oxide alone or followed by, i.e., capped with, ethylene oxide. Pursuant to this embodiment, the supplemental polyol is an oxypropylated or oxypropylated then oxyethylated diol or triol, the triol being most preferred.

In preparing the supplemental polyol, the oxyalkylation reaction is allowed to proceed until the desired molecular weight is reached, at which time the reaction is terminated and the resulting polyol is recovered. As noted above, the molecular weight of the resulting polyol may range from about 1,000 to about 6,000 and preferably from about 1,200 to about 4,500. In accordance with the most preferred embodiments of the invention, a supplemental polyol as described above is used which has a molecular weight of about 2,000–4,000.

Any suitable proportion of the supplemental polyol may be employed which is effective in reducing the friability of the foam without otherwise interfering with, or detrimentally altering, its properties. Usually a proportion is used ranging from about 5 to about 35, and preferably about 8–30, parts per every 100 parts by weight of the main polyol reactant. The requisite proportion of the supplemental polyol may be preparatorily blended in with the main polyol reactant or it may be added separately to the foam-forming reaction mixture.

In preparing the foams of the invention, the abovedescribed polyols are reacted with an organic polyisocyanate in the presence of a reaction catalyst and a foaming agent. Either the one-shot method or the prepolymer technique may be employed in carrying out the reaction. Any suitable organic polyisocyanate, or mixture of polyisocyanates, may be employed which is capable of reacting with a polyether polyol to form a polyurethane. Illustrative are toluene diisocyanate, such as the 80:20 and the 65:35 mixtures of the 2,4:2,6-isomers, methylene-bis(4-phenylisocyanate), 3,3'-bitolylene 4,4'-diisocyanate, 3,3'-dimethoxy-4,4'-biphenylene diisocyanate, naphthylene-1,5-diisocyanate, hexamethylene diisocyanate, polymethylene polyphenylisocyanate, and the like. The preferred isocyanates are toluene diisocyanate, polymethylene polyphenylisocyanate (which is available as a commercial product, varying in functionability from 2.2 to 3.2, under the trademark "PAPI"), and mixtures thereof. The amount of isocyanate employed in the preparation of the polyurethane foams should be sufficient to provide at least about 0.9, and preferably about 1.0–1.2, NCO groups per each hydroxy group present in the foam-forming reaction system. A 100 multiple of the ratio of NCO to OH groups in the foam-forming reaction system is referred to as the "index".

The foaming agent employed in preparing the polyurethane foams can be any one of those known in the art to be useful for this purpose such as water, the halogenated hydrocarbons, and mixtures thereof. The preferred foaming agents are the halogenated hydrocarbons which include, for example, monofluorotrichloromethane, difluorodichloromethane, the trichlorotrifluoroethanes, dichlorotetrafluoroethane, methylene chloride, chloroform, carbon tetrachloride, and the like. The amount of foaming agent, or mixture of foaming agents, can be varied over a wide range. Generally, however, the halogenated hydrocarbons are employed in an amount ranging from about 1 to about 75 parts by weight per 100 parts of total polyols in the foam-forming reaction system; and generally water is employed in an amount ranging from about 0.1 to about 10 parts by weight per 100 parts of total polyols.

Any of the catalysts, or mixtures thereof, which are known in the art to catalyze the polyurethane foam-forming reaction may be employed in preparing the foams of the invention. These include the tertiary amines, such as N-methylmorpholine and triethylene diamine, and the organic metal salts such as stannous octoate and dibutyltin dilaurate. Generally the catalyst is employed in any suitable catalytic proportion such as from about 0.05 to about 3.0, and preferably from about 0.075 to about 2.0, percent by weight based on the total weight of polyols in the reaction system.

It is preferred in the preparation of the polyurethane foams of the invention to employ minor amounts of a conventional polyurethane foam surfactant. Typical of these are the silicon-based surfactants such as the silicone oils and soaps and the siloxanes. Usually the amount of surfactant ranges up to about 2 parts by weight per 100 parts of total polyols in the reaction system.

Various additives may also be incorporated in the polyurethane foam-forming reaction mixture, if desired, such as fillers, dyes, plasticizers, deodorants, and antioxidants.

The improved process of the invention provides a relatively simple and practically attractive route to resolving the problem of high surface friability in rigid polyurethane foam. Furthermore, this objective is achieved at minimum cost and without undermining or altering the other basic properties of the foam.

The polyurethane foams of the invention are of utility in a variety of commercial and industrial applications including for example the production of foam-insulated food and beverage containers, sporting goods, and like applications. They are of particular utility in those applications requiring a rigid foam which, along with being flame retardant, can be sprayed onto, and adheres to, wood and other structural materials. Such applications include the on-site generation of foam in the insulation of houses and other structural installations.

The following examples are provided to illustrate the invention. In these examples, a variety of supplemental polyols are used as indicated. Otherwise, the other foam forming ingredients are essentially the same throughout. They are as follows:

| Ingredients | Parts by Weight |
| --- | --- |
| Main polyol reactant [1] | 100.0 |
| Trifluorochloromethane foaming agent | 46.0 |
| Dimethylcyclohexylamine catalyst | 1.0 |
| Dow Corning® 193 Surfactant [2] | 2.0 |
| Polymethylene polyphenylisocyanate [3] | (115 index) [4] |

[1] This is a 360 hydroxyl number polyether polyol prepared by condensing, in the presence of boron trifluoride etherate catalyst, 4,4,4-trichloro-1,2-epoxybutane with an equi-molar mixture of ethylene glycol and α-d-glucose monohydrate.
[2] This is a silicone-glycol copolymer described in an August 1968 Dow Corning bulletin No. 05-146.
[3] This is a commercial product of the Upjohn Company purchased under the trademark "PAPI" and having an approximate functionability of 2.6.
[4] The proportion of isocyanate was calculated to provide in each example an index of 115.

Further in the examples, surface friability is tested by downwardly finger-rubbing the side of the foam bun, using sufficient finger pressure to form a slight indentation in the foam. The effect of this treatment is observed visually and on that basis the surface friability of the foam is rated as "high", "moderate", or "low". A high rating is given a foam which exhibits excessive surface crumbling; a moderate rating is given a foam which exhibits markedly reduced though still considerable crumbling; and a low rating indicates that the foam exhibits slight or no crumbling at all.

EXAMPLE 1

A rigid polyurethane foam, identified as E-1, was prepared from a reaction mixture consisting of the above ingredients, in the indicated proportions, and 20 parts by weight of oxypropylated glycerin, molecular weight 3,000, as a supplemental polyol. The ingredients were handmixed and foamed in a square cardboard box. After being cured, the resulting foam was removed from the box and its surface friability was tested in accordance with the test described above. The foam exhibited very slight surface crumbling and it was given a low friability rating.

EXAMPLES 2–10

Except for one modification, the identical procedure of Example 1 was used to prepare 9 foams identified as E-2 through E-10. The modification is that instead of the 3,000 molecular weight oxypropylated glycerin which was used in Example 1, other supplemental polyols were used. The identity of each of these supplemental polyols and the surface friability rating of the resulting foams are provided in Table 1 below.

COMPARISON 1–5

Except for one modification, the exact procedure of Example 1 was followed in preparing and testing five rigid foams identified as C-1 through C-5. The modification was in connection with the use of the supplemental polyol. Thus in carrying out Comparison 1 no supplemental polyol was included in the foam forming formulation; and in Comparisons 2–5 various supplemental polyols were used in lieu of the 3,000 molecular weight oxypropylated glycerin which was used in Example 1. These supplemental polyols, all of which do not meet the molecular weight criterion specified according to the invention, are identified in Table 1 along with the surface friability ratings for each of foams C-1 through C-5.

Table 1

| Foam | Supplemental Polyol Used | Surface Friability |
|---|---|---|
| E-1 | Oxypropylated glycerin, mol wt. 3000 | Low |
| E-2 | Oxypropylated ethylene glycol, mol. wt. 2000 | Low |
| E-3 | Oxypropylated ethylene glycol, mol. wt. 3000 | Low |
| E-4 | Oxypropylated ethylene glycol, mol. wt. 4000 | Low |
| E-5 | Oxypropylated then oxyethylated (15 moles EO) glycerin, mol. wt. 5340 * | Low |
| E-6 | Oxypropylated then oxyethylated (15 moles EO) glycerin, mol. wt. 5840 * | Low |
| E-7 | Oxypropylated then oxyethylated (5 moles EO) glycerin, mol. wt. 3000 * | Low |
| E-8 | Oxypropylated then oxyethylated (7.5 moles EO) glycerin, mol. wt. 3000 * | Low |
| E-9 | Oxypropylated glycerin, mol. wt. 1000 | Moderate |
| E-10 | Oxypropylated ethylene glycol, mol. wt. 1000 | Moderate |
| C-1 | None | High |
| C-2 | Diethylene glycol | High |
| C-3 | Oxypropylated ethylene glycol, mol. wt. 400 | High |
| C-4 | Oxypropylated ethylene glycol mol. wt. 700 | High |
| C-5 | Oxypropylated glycerin, mol. wt. 600 | High |

* These polyols were prepared by the sequential oxyalkylation of glycerin first with propylene oxide and then with the indicated molar proportion of ethylene oxide (EO).

The data in Table 1 demonstrates the reduction of surface friability which obtains by using a variety of supplemental polyols, per Examples 1 through 10, according to the invention, as compared with foam C-1 in which no supplemental polyol was used. This data further demonstrates, per C-2 through C-5, that practically no reduction in surface friability is achieved where other supplemental polyols, which do not meet the molecular weight criterion of the invention, are employed at the same level as used in Examples 1–10.

What is claimed is:

1. In a process of preparing a rigid polyurethane foam from a reaction mixture comprised of a polyether polyol reactant, an organic polyisocyanate reactant, a reaction catalyst and a foaming agent, said polyether polyol reactant having a hydroxyl number of about 150–800 and being the product of condensing 4,4,4-trichloro-1,2-epoxybutane with a mixture selected from the group consisting of a mixture of dextrose and water, a mixture of dextrose and an aliphatic diol or triol, and a mixture of dextrose, water an an aliphatic diol or triol, the improvement of including in said reaction mixture a second polyether polyol having 2–3 hydroxy groups and a molecular weight from about 1,000 to about 6,000, said second polyether polyol being employed in a proportion which is effective in reducing the friability of said foam.

2. A polyurethane foam prepared by the process of claim 1.

3. The process of claim 1 wherein said second polyether polyol is an oxypropylated or oxypropylated than oxyethylated diol or triol.

4. The process of claim 3 wherein said second polyether polyol has a molecular weight of about 1,200–4,500.

5. A polyurethane foam prepared by the process of claim 4.

6. The process of claim 4 wherein said polyether polyol reactant is the product of condensing, in the presence of a Lewis acid catalyst, 4,4,4-trichloro-1,2-epoxybutane with a mixture of dextrose and an aliphatic diol or triol alcohol.

7. The process of claim 6 wherein said polyether polyol reactant has a hydroxyl number of about 260–550.

8. A polyurethane foam prepared by the process of claim 7.

9. The process of claim 7 wherein said second polyether polyol has a molecular weight of about 2,000–4,000 and is an oxypropylated triol or an oxypropylated then oxyethylated triol.

10. The process of claim 9 wherein said second polyether polyol is employed in a proportion of about 8–30 parts per every 100 parts by weight of said polyether polyol reactant.

11. A polyurethane foam prepared by the process of claim 10.

12. The process of claim 10 wherein said Lewis acid catalyst is boron trifluoride or an etherate derivative thereof.

13. The process of claim 12 wherein the mixture used in preparing said polyether polyol reactant is a mixture of α-d-glucose monohydrate and ethylene glycol.

14. A polyurethane foam prepared by the process of claim 13.

15. The process of claim 13 wherein said reaction mixture comprises a silicon-based surfactant.

16. The process of claim 15 wherein said foaming agent is a halogenated hydrocarbon foaming agent and said organic polyisocyanate is toluene diisocyanate, polymethylene polyphenyl isocyanate, or a mixture thereof.

17. A polyurethane foam prepared by the process of claim 16.

* * * * *